H. HOLT.
AMUSEMENT DEVICE.
APPLICATION FILED SEPT. 4, 1914.
1,164,186.
Patented Dec. 14, 1915.
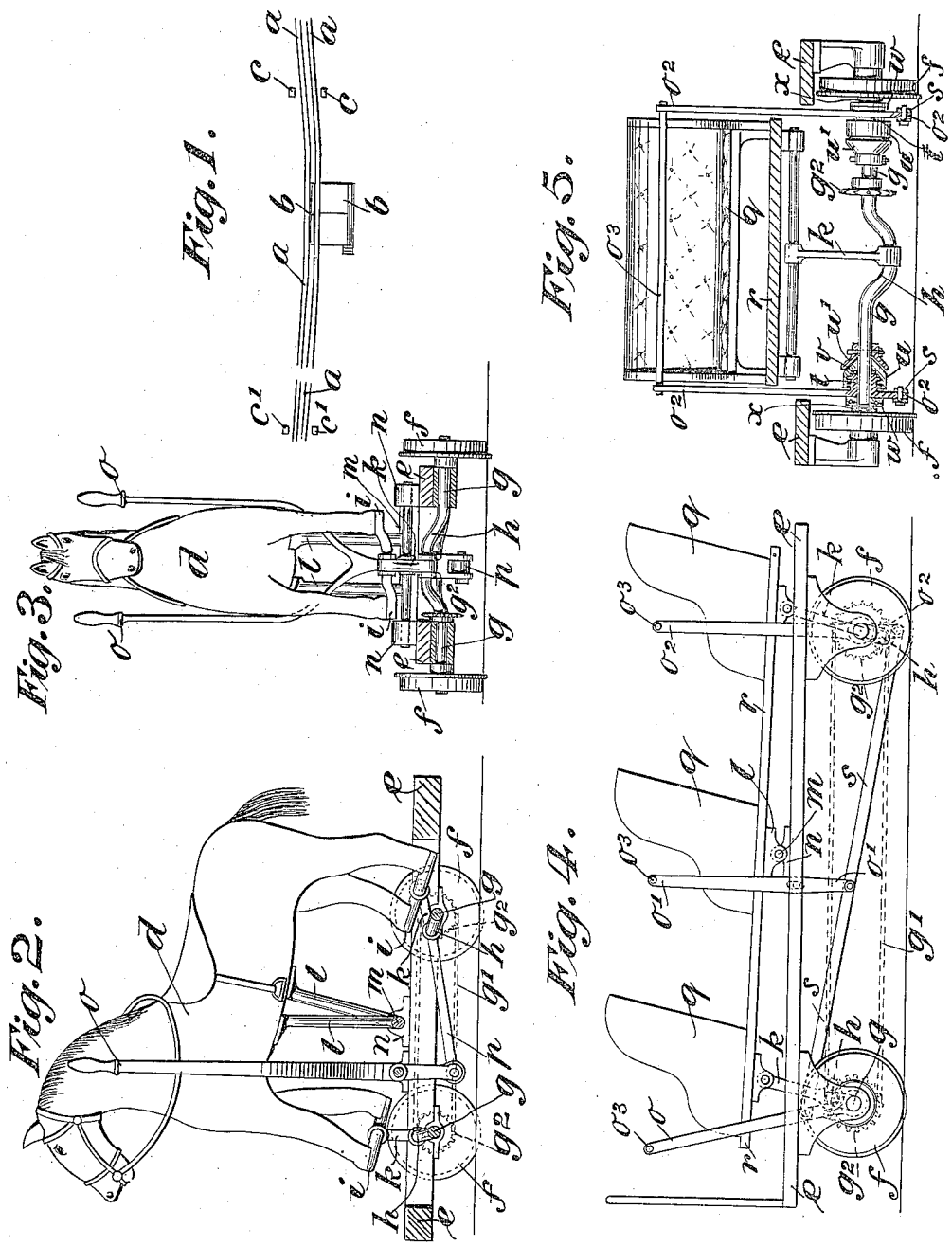
Wittnesses·
Alfred Bosshardt.
Stanley R Bramall
Inventor.
Harry Holt.
Per Ferdinand Bosshardt.
Attorney.

UNITED STATES PATENT OFFICE.

HARRY HOLT, OF BURY, ENGLAND.

AMUSEMENT DEVICE.

1,164,186.  Specification of Letters Patent.  Patented Dec. 14, 1915.

Application filed September 4, 1914. Serial No. 860,206.

*To all whom it may concern:*

Be it known that I, HARRY HOLT, subject of the King of Great Britain, and resident of Bury, in the county of Lancaster, England, have invented a certain new and useful Improved Amusement Device, of which the following is a specification.

My invention relates to improvements in that type of amusement devices which consists of a number of rails arranged in an oval, spiral or other suitable form and of hobby-horses, boats or the like pivoted to a frame provided with wheels to run on the said rails and adapted to be rocked on the said frame by the rider and the said wheels thereby rotated and the hobby-horse or the like propelled through the medium of cranks, a ratchet device or drums on the wheel axles and rods or ropes, respectively; or in some cases by a hand lever and a rod pivotally connected with a crank on one of the wheel axles.

The object of my invention is to provide means for rocking and propelling the said hobby-horse or the like in a more efficient manner than hitherto has been the case. I attain this object by the mechanism illustrated in the accompanying sheet of drawing, in which—

Figure 1 is a diagrammatical plan of a race-course employed in my invention. Figs. 2 and 3 are respectively a side elevation partly in section and a front view of the hobby-horse and Figs. 4 and 5 respectively a side elevation and a cross section of a car and propelling mechanism constructed in accordance with my invention and used on the said race-course.

Similar letters refer to similar parts throughout the several views.

According to my invention a race-course will be constructed and hobby-horses, cars, boats or the like employed thereon constructed as follows:—Referring to Fig. 1, the said race-course may consist of a number of rails $a$ laid parallel in an oval, circle, spiral or any other suitable form in a horizontal plane, or inclined plane on the gravity system. $b$ is the platform which may be of any suitable size and shape for the passengers to get on and off, $c$ and $c'$ are respectively the starting and finishing posts of the race-course.

Referring to Figs. 2 and 3, when using hobby-horses $d$ in this embodiment a frame $e$ is provided for each horse mounted on four wheels $f$ secured in pairs to axles $g$ having cranks $h$. The horse's front and hind feet are each secured to a plate $i$ which by means of a swivel rod $k$ is connected to one of the said cranks. Each horse is also carried by supports $l$, extending from a shaft $m$ adapted to rock in bearings $n$ secured to the frame $e$ and at its upper end secured underneath and at about the middle of the horse.

On each side of the horse's head, a hand lever $o$ is pivoted to the frame $e$ and by means of a swivel rod $p$ connected to the crank $h$ of the axle of the back wheels.

To insure the two crank axles rotating in unison with each other they are coupled together by such as a chain $g'$ and sprocket wheels $g^2$. The said hand levers are adapted to be oscillated by the rider of the horse which causes the said crank axle and wheels to turn and the horse to be propelled forward while at the same time the fore and hind parts of the horse will be caused to move alternately up and down in imitation of the galloping of the horse.

Referring to Figs. 4 and 5 when using cars, in this embodiment, seats $q$ are secured to a platform $r$, say three, each large enough to seat two persons. By means of the support $l$, shaft $m$ and bearing $n$ this platform in the middle is pivoted to the frame $e$ mounted on the wheels $f$ secured in pairs to the axles $g$ having each a crank $h$ pivotally connected by a rod $k$ to the front and back end of the seat platform $r$. On each side of the seats $q$ hand levers $o$, $o'$, $o^2$ are employed coupled together in pairs by a rail $o^3$ and adapted to rotate the crank axles $g$. The front and back seat levers $o$, $o^2$ are fulcrumed to the crank axles $g$ and the levers $o'$ of the middle seat, to the side of the wheel frame $e$ while all the levers on one side are connected together by a rod $s$ so as to move in unison with each other. In the present instance the inner side of each of the front and back levers $o$, $o^2$ has an externally screw threaded boss $t$, see more particularly Fig. 5, which engages in an internally screw-threaded "he" cone $u$ arranged to be brought in and out of frictional contact with a "she" cone $u'$ secured to the crank axle $g$. The said threads are so formed, that when moving either set of levers $o$, $o'$ and $o^2$ forward, the bosses $t$ on the levers $o$, $o^2$ will turn the "he" cones $u$ forward into frictional contact with, and thereby engage the "she" cones $u'$ and turn the respective wheel axles and vice versa when moving either set of levers $o$, $o'$ and $o^2$ backward, the bosses $t$ of the levers $o$, $o^2$ will turn the "he" cones backward out of frictional contact with and thus release the "she" cones $u'$ and respective wheel axle. The said hand levers are laterally kept in position on the crank axle $g$ by a collar $v$ secured on the crank axle bearing against the side of the said screw-threaded boss and by a ball bearing $w$ employed against the outer side of the levers $o$, $o^2$, a nut $x$ rendered adjustable against the ball bearing $w$ being also provided to compensate for wear. In order to insure also in this embodiment the two crank axles rotating in unison with each other, they are also coupled together by such a chain $g'$ and sprocket wheels $g^2$, so that when the front wheel axle has a turn imparted by the levers $o$ and the back wheel axle is released by the levers $o^2$, the chain $g'$ will drive the back wheel axle and vice versa, when the back wheel axle has a turn imparted by the lever $o^2$ and the front wheel axle is released by the levers $o$, the chain $g'$ will drive the front wheel axle. In this embodiment the race-course is preferably constructed on the gravity system, similar to a "scenic" railway, rising to a suitable height and descending in a spiral.

I claim:

1. In an amusement device of the type hereinbefore referred to a pair of wheel axles having each a crank, a frame carried by the said axles, a seat for the rider, means for oscillatory mounting the body of the said seat on the said frame, rods pivotally connecting the said cranks to each end of the said seat body, hand levers located on each side of the said body, means for imparting rotary motion from the said hand levers to the said axles and means for rotatably coupling together the said axles, all combined substantially as and for the purpose set forth.

2. In an amusement device of the type hereinbefore referred to, a pair of wheel axles having each a crank, a frame carried by the said axles, a seat for the rider, means for oscillatory mounting the body of the said seat on the said frame, consisting of a support the lower end of which is fulcrumed to the middle of the said frame and the upper end of which is secured to the middle of the said seat body, rods pivotally connecting the said cranks to each end of the said seat body, hand levers located on each side of the said body, means for imparting rotary motion from the said hand levers to the said axles and means for rotatably coupling together the said axles, all combined substantially as and for the purpose set forth.

3. In an amusement device of the type hereinbefore referred to, a pair of wheel axles having each a crank, a frame carried by the said axles, a seat for the rider, means for oscillatory mounting the body of the said seat on the said frame, rods pivotally connecting the said cranks to each end of the said seat body, hand levers located on each side of the said body arranged in pairs, the middle pair being fulcrumed to the said frame and the end pairs to the said axles, means for imparting rotary motion from the said hand levers to the said axles and means for rotatably coupling together the said axles, all combined substantially as and for the purpose set forth.

Signed at Manchester, in the county of Lancaster, England, this 25th day of August, A. D., 1914.

HARRY HOLT.

Witnesses:
 ALFRED BOSSHARDT,
 STANLEY E. BRAMALL.

Copies of this patent may be obtained for five cents each, by addressing the "Commissioner of Patents, Washington, D. C."